United States Patent
Hayasaka et al.

(10) Patent No.: US 9,077,886 B2
(45) Date of Patent: *Jul. 7, 2015

(54) IMAGE PICKUP APPARATUS AND IMAGE PROCESSING APPARATUS

(71) Applicant: Sony Corporation, Tokyo (JP)

(72) Inventors: Kengo Hayasaka, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,862

(22) Filed: Jul. 15, 2014

(65) Prior Publication Data

US 2014/0327809 A1 Nov. 6, 2014

Related U.S. Application Data

(63) Continuation of application No. 12/458,755, filed on Jul. 22, 2009, now Pat. No. 8,830,382.

(30) Foreign Application Priority Data

Aug. 29, 2008 (JP) ................................ 2008-221813

(51) Int. Cl.
*H04N 5/232* (2006.01)
*H04N 5/225* (2006.01)

(52) U.S. Cl.
CPC ............. *H04N 5/232* (2013.01); *H04N 5/2254* (2013.01); *H04N 5/23212* (2013.01)

(58) Field of Classification Search
CPC ..... H04N 5/232; H04N 5/225; H04N 5/2254; H04N 5/23212; H04N 5/228; H04N 5/22312; H01L 27/00
USPC ................. 348/345–360, 222.1, 208.12, 326; 250/208.1
See application file for complete search history.

(56) References Cited

U.S. PATENT DOCUMENTS 8,830,382 B2 * 9/2014 Hayasaka et al. ............. 348/350
2007/0206940 A1 * 9/2007 Kusaka ......................... 396/128
(Continued)

FOREIGN PATENT DOCUMENTS

JP 01-216306 A 8/1989
JP 2000-156823 A 6/2000
(Continued)

OTHER PUBLICATIONS

R. Ng et al., "Light Field Photography with a Hand-Held Plenoptic Camera," Stanford Tech Report CTSR Feb. 2005, pp. 1-11.
(Continued)

*Primary Examiner* — Tuan Ho
*Assistant Examiner* — Marly Camargo
(74) *Attorney, Agent, or Firm* — Fishman Stewart Yamaguchi PLLC

(57) ABSTRACT

An image pickup apparatus includes: an image pickup lens having an aperture stop; an image pickup device obtaining image pickup data based on light detected; one or more microlenses arranged between the image pickup lens and the image pickup device so as to correspond to a plurality of pixels in a partial region of the image pickup device; and an image processing section performing image processing based on the image pickup data obtained from the image pickup device, in which the image processing section includes: a distance measurement section measuring a distance from the image pickup lens to a measurement object based on pixel data in the partial region of the image pickup device, and an interpolation section interpolating pixel data for the partial region of the image pickup device.

14 Claims, 12 Drawing Sheets

(56) References Cited

U.S. PATENT DOCUMENTS

| | | | |
|---|---|---|---|
| 2007/0252074 A1* | 11/2007 | Ng et al. | 250/208.1 |
| 2008/0266655 A1* | 10/2008 | Levoy et al. | 359/368 |
| 2009/0096886 A1* | 4/2009 | Kusaka | 348/222.1 |
| 2009/0140131 A1* | 6/2009 | Utagawa | 250/226 |

FOREIGN PATENT DOCUMENTS

| | | |
|---|---|---|
| JP | 2000-292686 A | 10/2000 |
| JP | 2002-237992 A | 8/2002 |
| JP | 2004-191893 A | 7/2004 |
| JP | 2005-308777 A | 11/2005 |
| JP | 2007-158109 A | 6/2007 |
| WO | WO-2006-039486 | 4/2006 |
| WO | WO-2007/044725 A2 | 4/2007 |

OTHER PUBLICATIONS

Japanese Office Action issued Jun. 22, 2010 for corresponding Japanese Application No. 2008-221813.

Japanese Office Action issued Oct. 5, 2010 for corresponding Japanese Application No. 2008-221813.

European Patent Communication Pursuant to Article 94(3) EPC issued May 11, 2011 for corresponding Japanese Application No. 09 252 008.9.

* cited by examiner

CENTRAL COORDINATES $(x_1, y_1)$

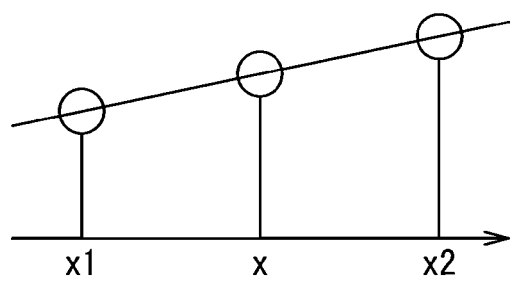
FIG. 12
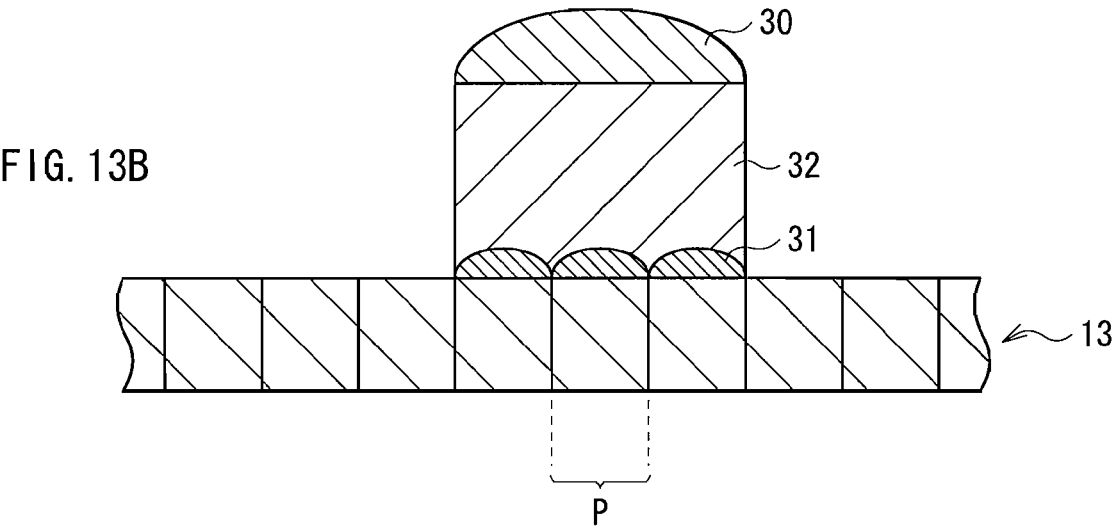
FIG. 13A
FIG. 13B

IMAGE PICKUP APPARATUS AND IMAGE PROCESSING APPARATUS

CROSS REFERENCES TO RELATED APPLICATIONS

The present invention is a Continuation of application Ser. No. 12/458,755, filed Jul. 22, 2009, and contains subject matter related to Japanese Patent Application JP 2008-221813 filed in the Japanese Patent Office on Aug. 29, 2008, the entire contents of which being incorporated herein by reference.

BACKGROUND OF THE INVENTION

1. Field of the Invention

The present invention relates to an image pickup apparatus using a microlens and an image processing apparatus using a microlens.

2. Description of the Related Art

Various image pickup apparatuses have been proposed and developed. An image pickup apparatus performing predetermined image processing on image pickup data obtained by picking up an image to output the processed image pickup data has been also proposed.

For example, International Patent Publication No. 06/039486 and Ren.Ng, et al. "Light Field Photography with a Hand-Held Plenoptic Camera", Stanford Tech Report CTSR 2005-02 propose image pickup apparatuses using a technique called "Light Field Photography". For example, as in the case of an image pickup apparatus 100 illustrated in FIG. 15, such an image pickup apparatus includes an image pickup lens 102 having an aperture stop 101 as a main lens for picking up an image of an object 2, a microlens array 103 in which a plurality of microlenses are arranged on the whole two-dimensional plane, an image pickup device 104 and an image processing section (not illustrated). Thereby, the image processing section reconstructs an image viewed from an arbitrary field of view or an arbitrary focal point on the basis of image pickup data obtained from the image pickup device 104.

SUMMARY OF THE INVENTION

More specifically, images focused on an arbitrary position are synthesized by performing refocusing arithmetic processing on the basis of image pickup data. Moreover, when images with parallaxes from arbitrary right and left view angles are reconstructed, and a phase difference between the images is determined, a distance to an object is measured.

In this case, the number of pixels in the image reconstructed by the above-described technique is equal to the number of lenses in a microlens array. In other words, the number of pixels in the reconstructed image is equal to a value determined by dividing the total number of pixels of the image pickup device by the number of pixels allocated to each microlens, because information on the two-dimensional coordinates of the reconstructed image is determined by the coordinates of the microlens array. For example, as illustrated in FIG. 15, in image pickup data D100 obtained by the image pickup apparatus 100 in FIG. 14, a region 103M corresponding to each microlens corresponds to one pixel in the reconstructed image. Therefore, in the case where, for example, 3×3=9 pixels are allocated to each microlens, the two-dimensional resolution of the reconstructed image is 1/9.

Therefore, for example, in the case where microlenses are arranged on the whole two-dimensional plane to measure a distance to an object, a reconstructed two-dimensional image tends to have low resolution.

It is desirable to provide an image pickup apparatus and an image processing apparatus which are capable of measuring a distance to an object and producing a two-dimensional image with higher resolution than ever before.

According to an embodiment of the invention, there is provided an image pickup apparatus including: an image pickup lens having an aperture stop; an image pickup device obtaining image pickup data based on light detected; one or more microlenses arranged between the image pickup lens and the image pickup device so as to correspond to a plurality of pixels in a partial region of the image pickup device; and an image processing section performing image processing based on the image pickup data obtained from the image pickup device. In this case, the image processing section includes: a distance measurement section measuring a distance from the image pickup lens to a measurement object based on pixel data in the partial region of the image pickup device, and an interpolation section interpolating pixel data for the partial region of the image pickup device.

According to an embodiment of the invention, there is provided an image processing apparatus including: an image processing section performing image processing based on image pickup data obtained from an image pickup device through use of an image pickup optical system including an image pickup lens and one or more microlenses, the microlenses being arranged between the image pickup lens and the image pickup device so as to correspond to a plurality of pixels in a partial region of the image pickup device. In this case, the image processing section includes: a distance measurement section measuring a distance from the image pickup lens to a measurement object based on pixel data in the partial region of image pickup device, and an interpolation section interpolating pixel data for the partial region of the image pickup device.

In the image pickup apparatus and the image processing apparatus according to the embodiment of the invention, an image of an object by the image pickup lens is formed on the image pickup device, thereby image pickup data of the object is obtained. At this time, when the microlenses are arranged between the image pickup lens and the image pickup device so as to correspond to the partial region of the image pickup device, the image pickup device detects a light ray having passed through the microlenses and including information on the intensity of the light ray as well as the traveling direction of the light ray. Therefore, in the distance measurement section of the image processing section, a distance from the image pickup lens to the measurement object is measured based on pixel data in the partial region of the above-described image pickup device. On the other hand, in the interpolation section, pixel data for the partial region is interpolated, and a two-dimensional image with a number of pixels equal to the number of pixels constituting the image pickup device is produced.

In the image pickup apparatus and the image processing apparatus according to the embodiment of the invention, the microlenses are arranged between the image pickup lens and the image pickup device so as to correspond to the partial region of the image pickup device, so the distance measurement section measures a distance from the image pickup lens to the measurement object based on pixel data in the partial region of the image pickup device. Moreover, pixel data for the partial region of the image pickup device is interpolated, so compared to the case where a microlens array in which microlenses are arranged on the whole plane thereof is used, a two-dimensional image with higher resolution is produced. Therefore, a distance to the measurement object is measured, and a two-dimensional image with higher resolution than ever before is produced.

Other and further objects, features and advantages of the invention will appear more fully from the following description.

BRIEF DESCRIPTION OF THE DRAWINGS

FIG. 12 is a schematic view for describing another example of pixel interpolation processing.

FIGS. 13A and 13B are sectional views of another example of a microlens and an image pickup device illustrated in FIG. 1.

DETAILED DESCRIPTION OF THE PREFERRED EMBODIMENTS

A preferred embodiment of the invention will be described in detail below referring to the accompanying drawings.

Figure 1:
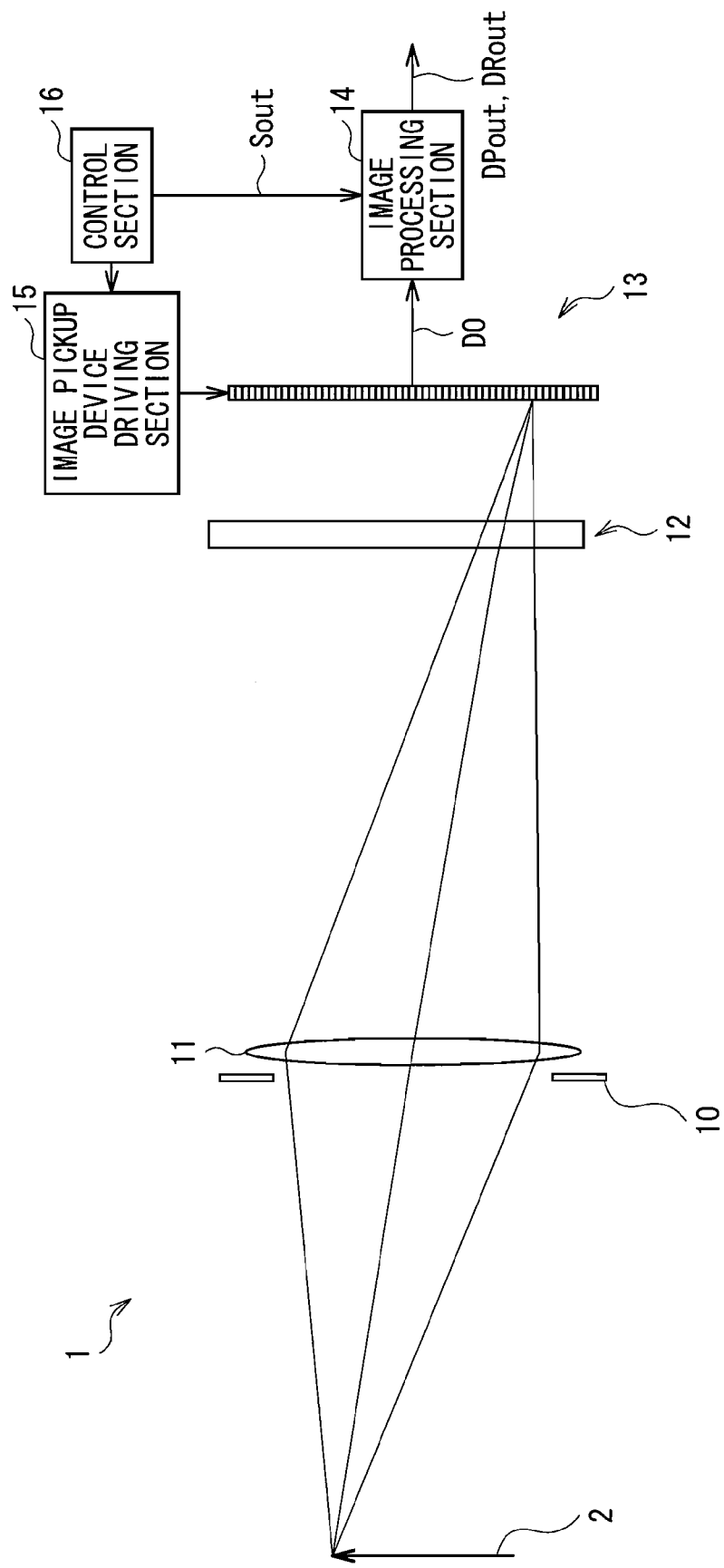
FIG. 1 is an illustration of the whole configuration of an image pickup apparatus according to an embodiment of the invention.

FIG. 1 illustrates the whole configuration of an image pickup apparatus (an image pickup apparatus 1) according to an embodiment of the invention. The image pickup apparatus 1 picks up an image of an object 2, and performs predetermined image processing on the image, thereby to output one or both of distance data DPout and image data DRout. The image pickup apparatus 1 includes an image pickup lens 11 having an aperture stop 10, a lens substrate 12, an image pickup device 13, an image processing section 14, an image pickup device driving section 15 and a control section 16.

The aperture stop 10 is an optical aperture stop of the image pickup lens 11. An image, which has a shape similar to the shape (for example, a circular shape) of an aperture of the aperture stop 10, of the object 2 is formed on the image pickup device 13 in each pixel region corresponding to a microlens (which will be described later) of the lens substrate 12.

The image pickup lens 11 is a main lens for picking up an image of the object 2, and includes, for example, a typical image pickup lens used in a video camera, a still camera or the like.

Figure 2:
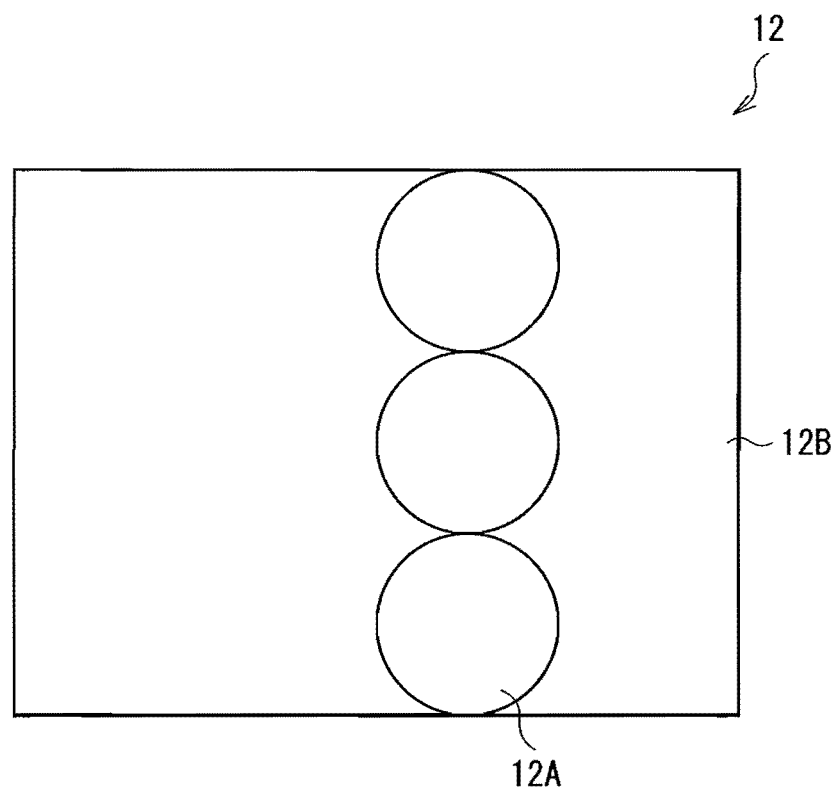
FIG. 2 is an illustration of a planar configuration of a lens substrate illustrated in FIG. 1.

The lens substrate 12 is formed by arranging a microlens 12A on a part of a substrate 12B made of, for example, glass. The lens substrate 12 is arranged in front of the focal plane (then image forming plane) of the image pickup lens 11 (on a side closer to the image pickup lens 11) by the focal length of the microlens 12A. FIG. 2 illustrates an example of a planar configuration of the lens substrate 12. As illustrated in the drawing, one or a plurality of (three in this case) microlenses 12A are arranged only in some regions in a plane of the lens substrate 12. Each microlens 12A is made of, for example, a solid lens, a liquid crystal lens, a diffractive lens or the like. The other region of the lens substrate 12 is made of a planar glass plate 12B.

The image pickup device 13 receives a light ray from the lens substrate 12 to obtain image pickup data D0 including a plurality of pixel data, and is arranged on the focal plane (the image forming plane) of the image pickup lens 11. The image pickup device 13 includes a plurality of pixels arranged in a matrix form on a light-sensing plane side, and each pixel is made of a two-dimensional solid-state image pickup device such as a CCD (Charge Coupled Device) or a CMOS (Complementary Metal-Oxide Semiconductor).

Each microlens 12A of the above-described lens substrate 12 is arranged so as to face an m×n number of pixels of the plurality of pixels on the image pickup device 13. In other words, a light ray having passed through the microlens 12A is detected by the number m×n of pixels on the image pickup device 13. For example, angular resolutions (the number of viewpoints) of right and left parallax images which will be described later are increased with an increase in the number m×n of pixels allocated to each microlens 12A. On the other hand, two-dimensional resolutions of the above-described parallax images are increased with a decrease in the number m×n of pixels. Therefore, there is a trade-off relationship between the angular resolution and two-dimensional resolution of the parallax images.

On the light-sensing plane of the image pickup device 13, for example, a color filter (not illustrated) is two-dimensionally arranged for each pixel. However, in the embodiment, the color filter is arranged only in a region facing a glass plate 12B of the above-described lens substrate 12, and the color filter is not arranged in a region facing each microlens 12A. As the color filter, a color filter (a primary color filter) having a Bayer arrangement in which filters of three primary colors, that is, red (R), green (G) and blue (B) are arranged in a checkered pattern at a ratio of R:G:B=1:2:1 is applicable. When such a color filter is arranged, image pickup data obtained from the image pickup device 13 becomes pixel data of a plurality of colors (in this case, three primary colors) corresponding to the colors of the color filter.

The image processing section 14 performs predetermined image processing on image pickup data D0 obtained by the image pickup device 13, and outputs distance data DPout from the image pickup lens 11 to an object as well as image data DRout as a two-dimensional image.

Figure 3:
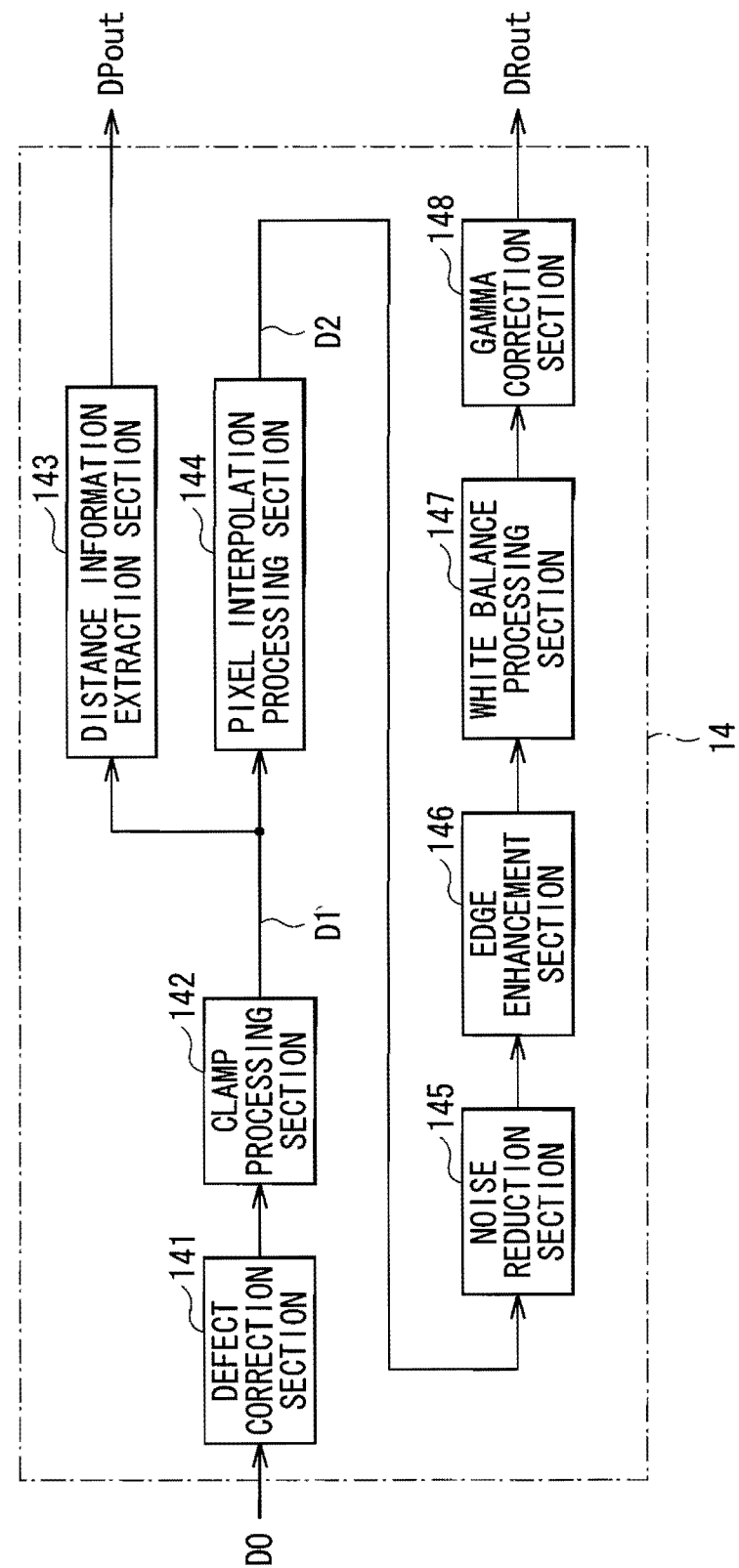
FIG. 3 is a functional block diagram of a schematic configuration of an image processing section illustrated in FIG. 1.

Referring to FIG. 3, the configuration of the image processing section 14 will be described below. FIG. 3 is a functional block diagram illustrating the whole configuration of the image processing section 14. As illustrated in FIG. 3, the image processing section 14 includes, for example, a defect correction section 141, a clamp processing section 142, a distance information extraction section 143, a pixel interpolation processing section 144, a noise reduction section 145, an edge enhancement section 146, a white balance processing section 147 and gamma correction section 148.

The defect correction section 141 corrects a defect such as loss or invalidity included in the image pickup data D0 (a defect caused by an abnormality in the image pickup device 13). The clamp processing section 142 performs a process (clamp processing) of setting the black level of each pixel data on image pickup data obtained by defect correction by the defect correction section 141. Moreover, color interpolation processing such as a demosaic process may be performed on image pickup data D1 obtained by the clamp processing.

The distance information extraction section 144 outputs the distance data DPout from the image pickup lens 11 to the object based on the image pickup data D1 supplied from the clamp processing section 142, and includes, for example, the following phase difference detection section and the following distance information calculation section (both not illustrated).

The phase difference detection section produces at least two parallax images with different parallaxes (arbitrary viewpoint images from different viewpoints) on the basis of the image pickup data D1, and then detects a phase difference between the parallax images.

The distance information calculation section calculates information on a distance from the image pickup lens 11 to the object based on the phase difference detected by the phase difference detection section.

The pixel interpolation processing section 144 produces image data D2 by performing pixel interpolation processing on the basis of the image pickup data D1 supplied from the clamp processing section 142.

The noise reduction section 145 performs a process of reducing noise (for example, noise generated when an image is picked up in a dark place or a place with insufficient sensitivity) included in image pickup data D2 supplied from the pixel interpolation processing section 144. The edge enhancement section 146 performs an edge enhancement process, that is, a process of enhancing the edge of an image on image pickup data supplied from the noise reduction section 145.

The white balance processing section 147 performs a process (a white balance adjustment process) of adjusting color balance affected by an individual difference among devices such as a difference in transmission characteristics of the color filter, a difference in spectral sensitivity of the image pickup device 13, illumination conditions, or the like on image pickup data supplied from the edge enhancement section 146.

The gamma correction section 148 performs predetermined gamma correction (tone or contrast correction) on image data supplied from the white balance processing section 147 so as to produce image pickup data DRout.

The image pickup device driving section 15 drives the image pickup device 13, and controls the light detection operation of the image pickup device 13.

The control section 16 controls the operations of the image processing section 14 and the image pickup device driving section 15, and includes, for example, a microcomputer or the like.

Next, referring to FIGS. 1 to 11, functions and effects of the above-described image pickup apparatus 1 will be described in detail below.

In the image pickup apparatus 1, an image of the object 2 by the image pickup lens 11 passes through the lens substrate 12 to be formed on the image pickup device 13. At this time, the microlens 12A is arranged in a part of the lens substrate 12, so a light ray passing through the microlens 12A to be detected on the image pickup device 13 forms the image, which has a shape similar to the aperture shape of the aperture stop 10, of the object 2.

When the light ray is detected by the image pickup device 13 in such a manner, the image pickup data D0 is obtained according to driving operation by the image pickup device driving section 15, and the image pickup data D0 is inputted into the image processing section 14.

When the image pickup data D0 is inputted into the image processing section 14, the defect correction section 141 performs defect correction on the image pickup data D0, and then the clamp processing section 142 performs clamp processing on the image pickup data D0. Image pickup data D1 obtained by the clamp processing is inputted into the distance information extraction section 143 or the pixel interpolation processing section 144.

Figure 4:
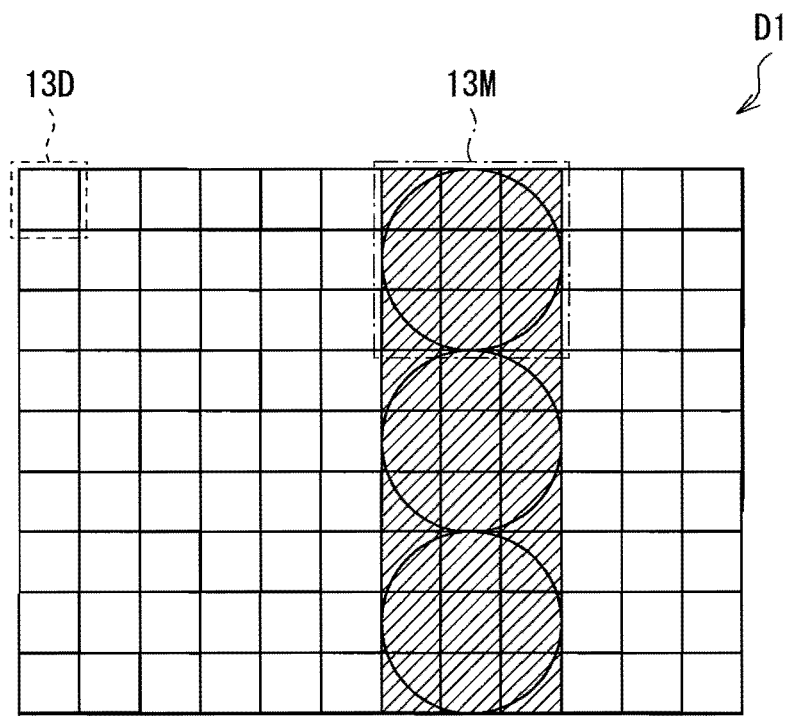
FIG. 4 is a schematic view of a planar configuration of image pickup data.
Figure 5:
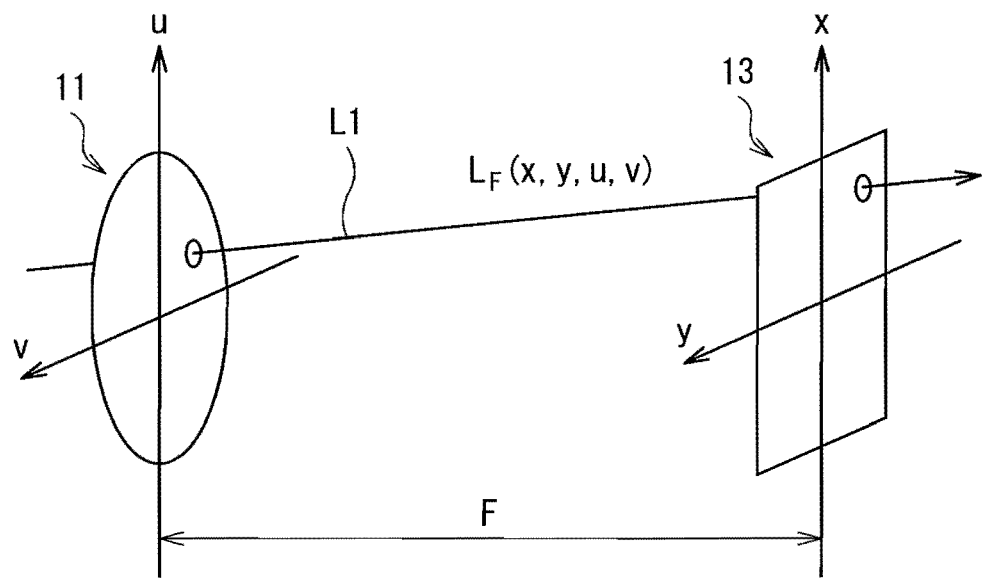
FIG. 5 is an illustration for describing a light ray sensed on an image pickup device.

Next, the image pickup data D1 will be described below referring to FIGS. 4 and 5. FIG. 4 schematically illustrates the two-dimensional configuration of the image pickup data D1, and FIG. 5 is an illustration for describing a light ray detected on the image pickup device 13.

As illustrated in FIG. 4, the image pickup data D1 includes a plurality of pixel data 13D corresponding to a plurality of pixels which are two-dimensionally arranged. Then, the pixel data 13D by a light ray having passed through the microlens 12A of the plurality of pixel data 13D form a microlens corresponding region 13M. In the microlens corresponding region 13M, as illustrated in FIG. 5, a rectangular coordinate system (u, v) is defined on an image pickup lens plane of the image pickup lens 11, and a rectangular coordinate system (x, y) is defined on an image pickup plane of the image pickup device 13. A distance between the image pickup lens plane of the image pickup lens 11 and the image pickup plane of the image pickup device 13 is defined as "F". Then, a light ray L1 passing through the image pickup lens 11 and the image pickup device 13 is represented by a four-dimensional function $L_F(x, y, u, v)$. Therefore, data including information on the intensity of the light ray as well as the traveling direction of the light ray is recorded into the image pickup device 13. That is, the incident direction of the light ray is determined by the arrangement of the plurality of pixels allocated to each microlens 12A in the microlens corresponding regions 13M. In other words, pixels at the same position in the microlens corresponding regions 13M have the same traveling direction of the detected light ray.

On the other hand, in the pixel data 13D (a region other than the microlens corresponding region 13M in FIG. 4) by a light ray having passed through the glass plate 12B in the lens substrate 12 in the image pickup data D1, only information on the intensity of the light ray is recorded. In the embodiment, for the purpose of simplification, the case where three microlenses 12A are arranged in a partial region of the lens substrate 12, and 3×3 pixels on the image pickup device 13 are allocated to each microlens 12A is described as an example.

Figure 6:
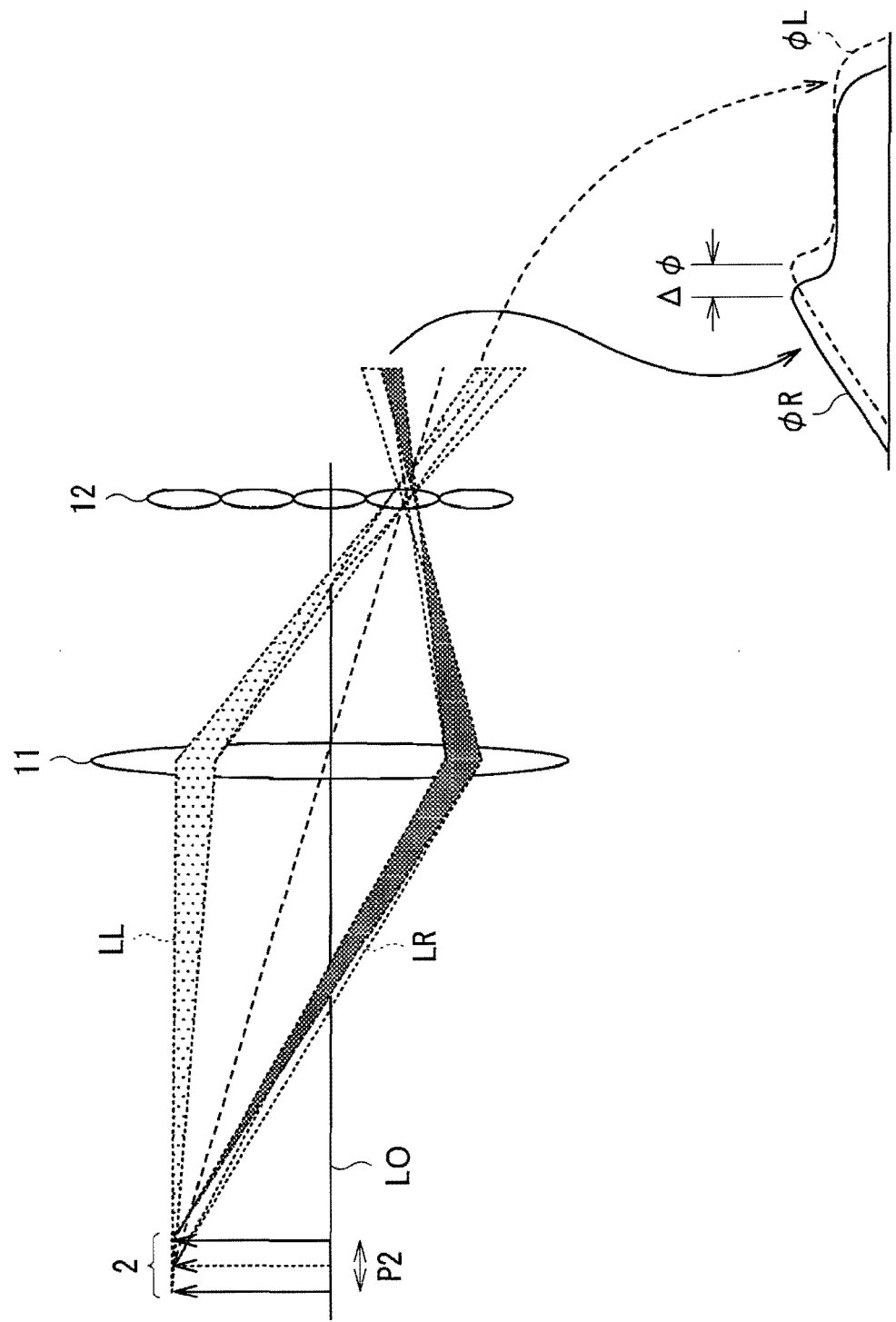
FIG. 6 is a schematic view for describing phase difference detection operation on the basis of two parallax images.

Next, referring to FIGS. 6 to 8, distance information extraction operation by the distance information extraction section 143 will be described in detail below.

First, the distance information extraction section 143 produces a plurality of parallax images with different parallaxes on the basis of pixel data in the microlens corresponding region 13M of the image pickup data D1 in the phase difference detection section. In this case, as described above, the microlens corresponding region 13M in the image pickup data D1 includes the intensity distribution of a light ray as well as the information on the traveling direction of the light ray, so each light ray is separately detected. Moreover, at this time, the number of pixels allocated to one microlens 12A is equal to the number of times the image pickup lens 11 is divided, that is, the number of viewpoints with different phase differences. More specifically, the pixel data 13D in pixels at the same position in the microlens corresponding regions 13M are extracted, and the extracted pixel data 13D are synthesized. Then, for example, as illustrated in FIG. 6, a phase difference Δφ between two right and left parallax images, that is, a parallax image by a light ray LR and a parallax image by a light ray LL (a phase difference between a phase φR of the parallax image by the light ray LR and a phase φL of the parallax image by the light ray LL) is detected.

Figure 7A:
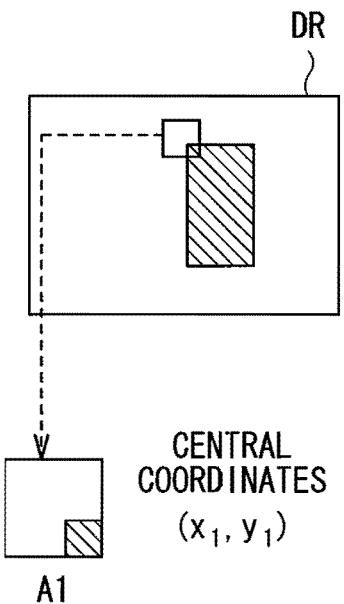
FIGS. 7A and 7B are schematic views for describing pixel correlation by two parallax images.
Figure 7B:
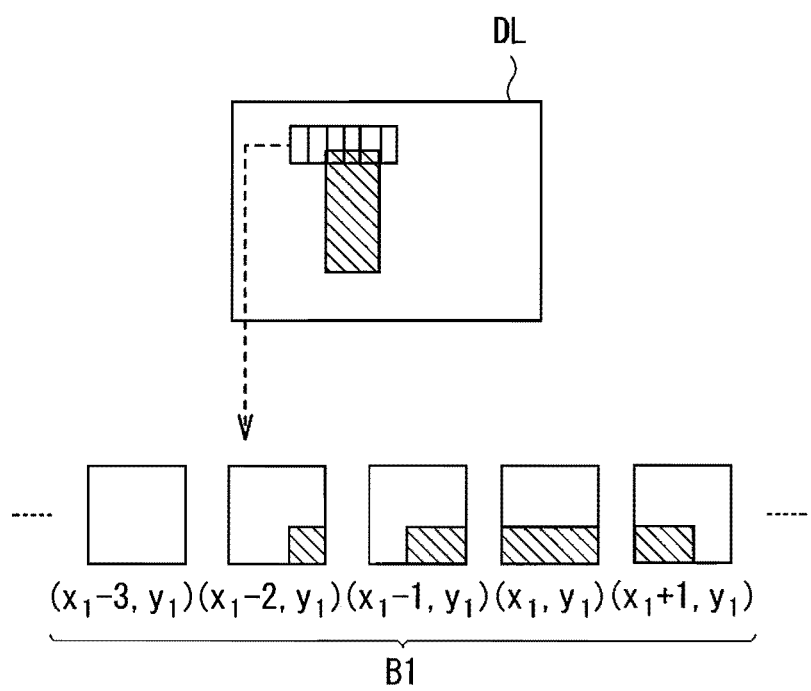

The above-described phase difference Δφ is detected, for example, as the following disparity. In other words, as illustrated in FIG. 7A, a partial image A1 (central coordinates: (x1, y1)) with a small region in a parallax image DR is extracted, and as illustrated in FIG. 7B, a partial image B1 (central coordinates: (x1, y1)) with small a region as that of the partial image A1 is extracted from a parallax image DL, and while the position of the partial image B1 is moved, a pixel correlation value by the following formula (1) is successively calculated. Then, the central point of the partial image B1 in a position where the pixel correlation value is the maximum is detected as a point corresponding to the central point of the partial image A1. A pixel shift at this time corresponds to the above-described disparity. Moreover, such arithmetic processing is performed on the whole parallax image DR while changing the extraction position of the partial image A1 with the small region, thereby a disparity map (a set of disparity) is obtained.

Mathematical Formula 1

$$\text{PIXEL CORRELATION VALUE (HORIZONTAL DIRECTION)} = \frac{\iint \{IMAGE\ DR(x,y) \times IMAGE\ DL(x-x',y)\}dxdy}{Sqrt\{\iint IMAGE\ DR(x,y)^2 dxdy\} \times Sqrt\{\iint IMAGE\ DL(x,y)^2 dxdy\}} \quad (1)$$

(An integral range is the whole range of the small region, and x' is a moving pixel of the image B1 with the small region)

Next, the distance information extraction section 143 calculates a distance d to an object in the distance information calculation section by the following formulas (4) to (9) through the use of the phase difference (disparity) between two parallax images DR and DL detected by the phase difference detection section. However, as illustrated in FIG. 8, a distance to the object-side focal plane of the image pickup lens 11 is "D", the focal length of the image pickup lens 11 is "F", the size of the aperture of the image pickup lens when determining disparity is "v", the image-side focal plane of the image pickup lens 11 when picking up an image of the object at the distance D is "f", the image-side focal place of the image pickup lens 11 when picking up the image of the object at a distance d from the image pickup lens 11 is "g", and a value obtained by calculating the object at the distance d through the use of the size v of the aperture ((Disparity)×(size of pixel P of image pickup device 13)×(the number of pixels allocated to the length of one side of the lens substrate 12) is "h".

Figure 8:
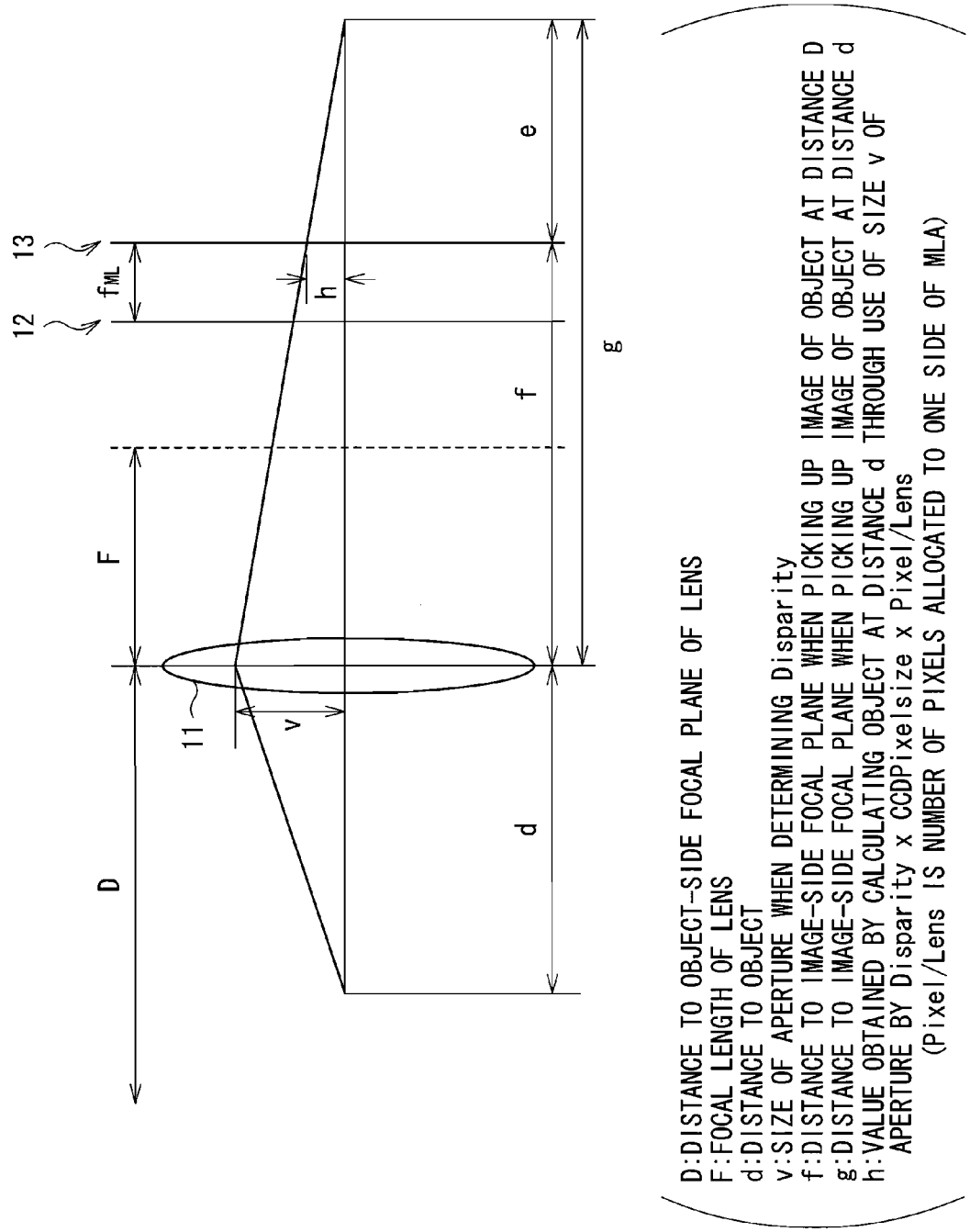
FIG. 8 is an illustration for describing a method of calculating a distance from an image pickup lens to an object.

In other words, first, the following formula (2) is obtained by a similarity relationship, and "e" is e=(g−f) as illustrated in FIG. 8, so when (g−f) is substituted into the formula (2), the following formula (3) is obtained, and then the following formula (4) is obtained by the formula (3). Moreover, the following formulas (5) and (6) are obtained by the imaging formula of the image pickup lens 11, so the following formula (7) is obtained by substituting the formula (5) into the formula (4), and the following formula (8) is obtained by the formula (6). Therefore, the following formula (9) is obtained by substituting the formula (8) into the formula (7), so when the values F, D and v in the formula (9) are already known, the distance d is calculated on the basis of disparity.

$$(h/e)=(v/g) \quad (2)$$

$$\{h/(g-f)\}=(v/g) \quad (3)$$

$$(1/g)=(1/f)\times\{1-(h/v)\} \quad (4)$$

$$(1/F)=(1/g)+(1/d) \quad (5)$$

$$(1/F)=(1/D)+(1/f) \quad (6)$$

$$(1/d)=(1/F)-[(1/f)\times\{1-(h/v)\}] \quad (7)$$

$$f=F\times\{D/(D-F)\} \quad (8)$$

$$(1/d)=(1/F)-[1/\{F\times D/(D-F)\}\times\{1-(h/v)\}] \quad (9)$$

In the embodiment, the lens substrate 12 is positioned in front of the focal plane of the image pickup lens 11 by a focal length $f_{ML}$ of the microlens 12A, so the distance information extraction section 143 performs correction on the distance d calculated in the above-described manner in consideration of the focal length of the microlens. More specifically, the distance information extraction section 143 performs correction on the distance d by subtracting a correction distance Δd represented by the following formula (10) from the distance d.

Δd=(distance between lens substrate 12 and image pickup device 13)×(longitudinal magnification of microlens 12A), that is, $$\Delta d = f_{ML} \times (D/f)^2 \quad (10)$$

Information on a distance (d−Δd) obtained by such correction is outputted to outside as the distance data DPout.

Figure 9:
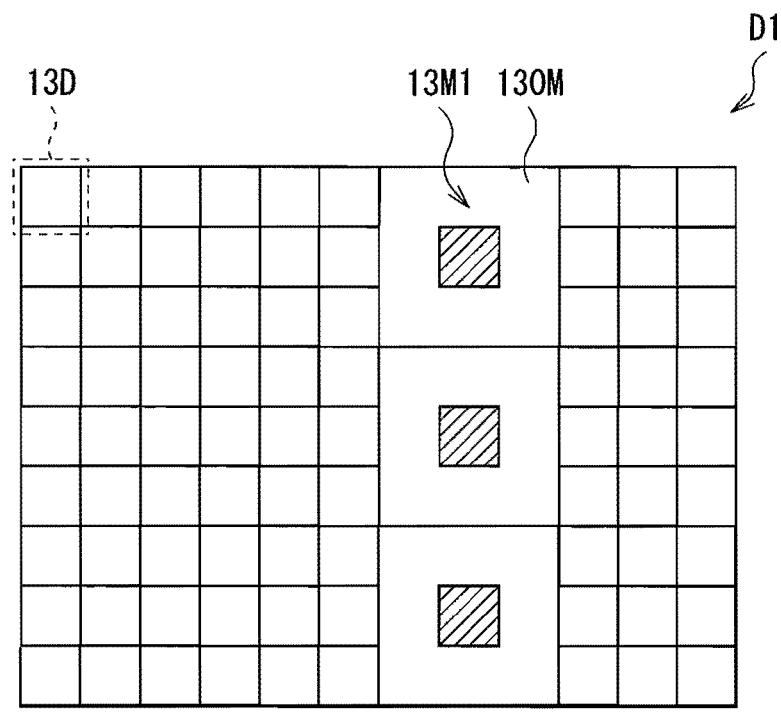
FIG. 9 is a schematic view for describing integration processing in image pickup data.

Next, referring to FIGS. 9 to 11, pixel interpolation processing operation in the pixel interpolation processing section 144 will be described in detail below.

First, the pixel interpolation processing section 144 performs color interpolation processing on the pixel data 13D in a region other than the microlens corresponding region 13M of the image pickup data D1. Next, as illustrated in FIG. 9, to determine the intensity of light detected by one microlens in the pixel data 13D in the microlens corresponding region 13M, integration processing is performed on all pixel regions allocated to one microlens. Image data 13M1 is reconstructed by performing the integration processing. The image data 13M1 corresponds to data for one pixel of the reconstructed image.

Figure 10:
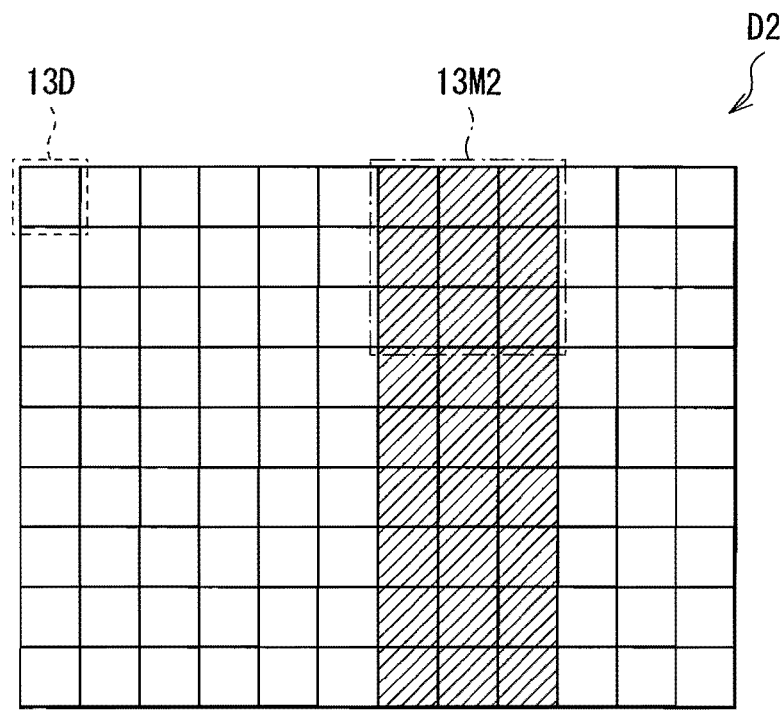
FIG. 10 is a schematic view for describing pixel interpolation processing operation in a pixel interpolation processing section.
Figure 11:
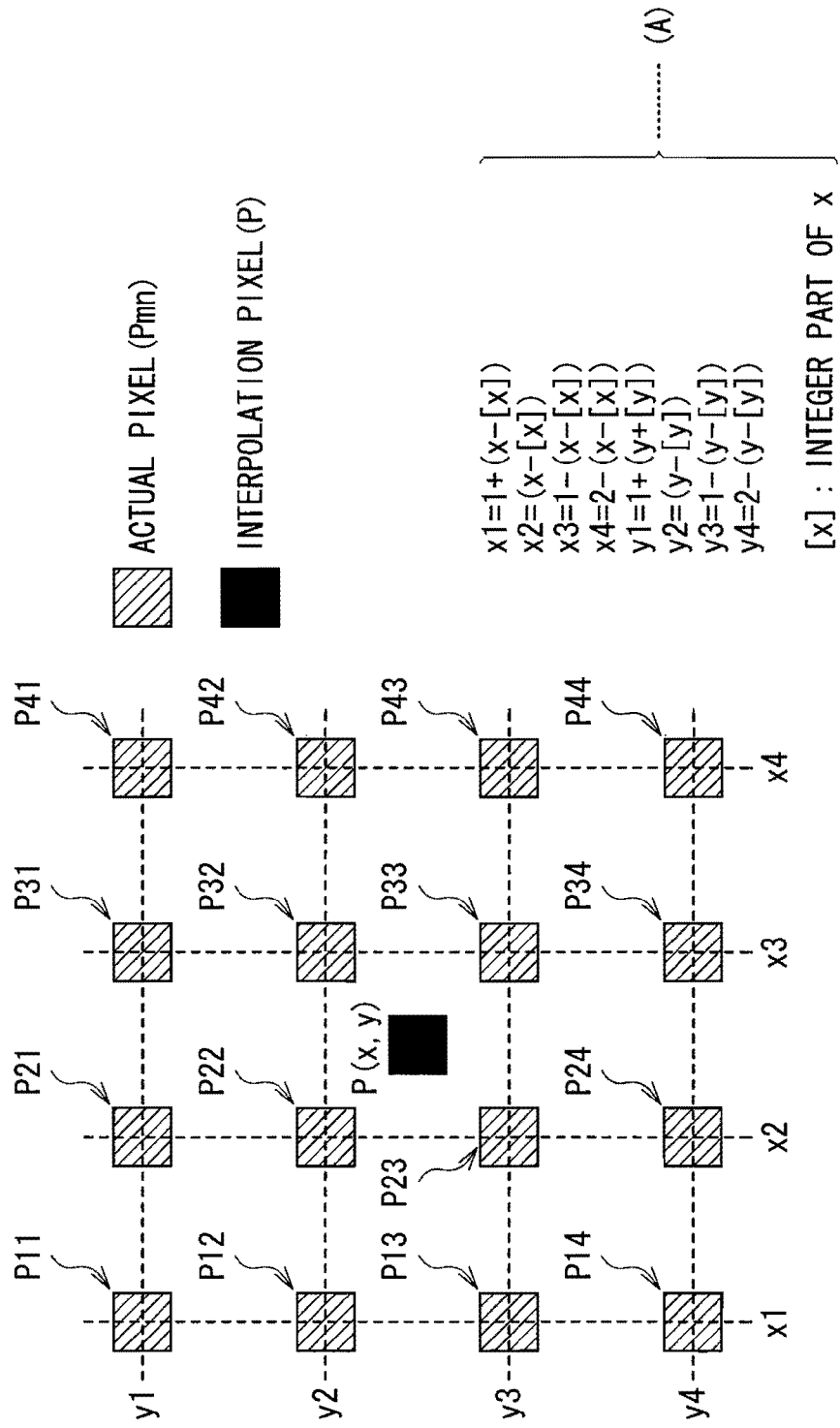
FIG. 11 is a schematic view for describing a bicubic method as an example of pixel interpolation processing.
Figure 14:
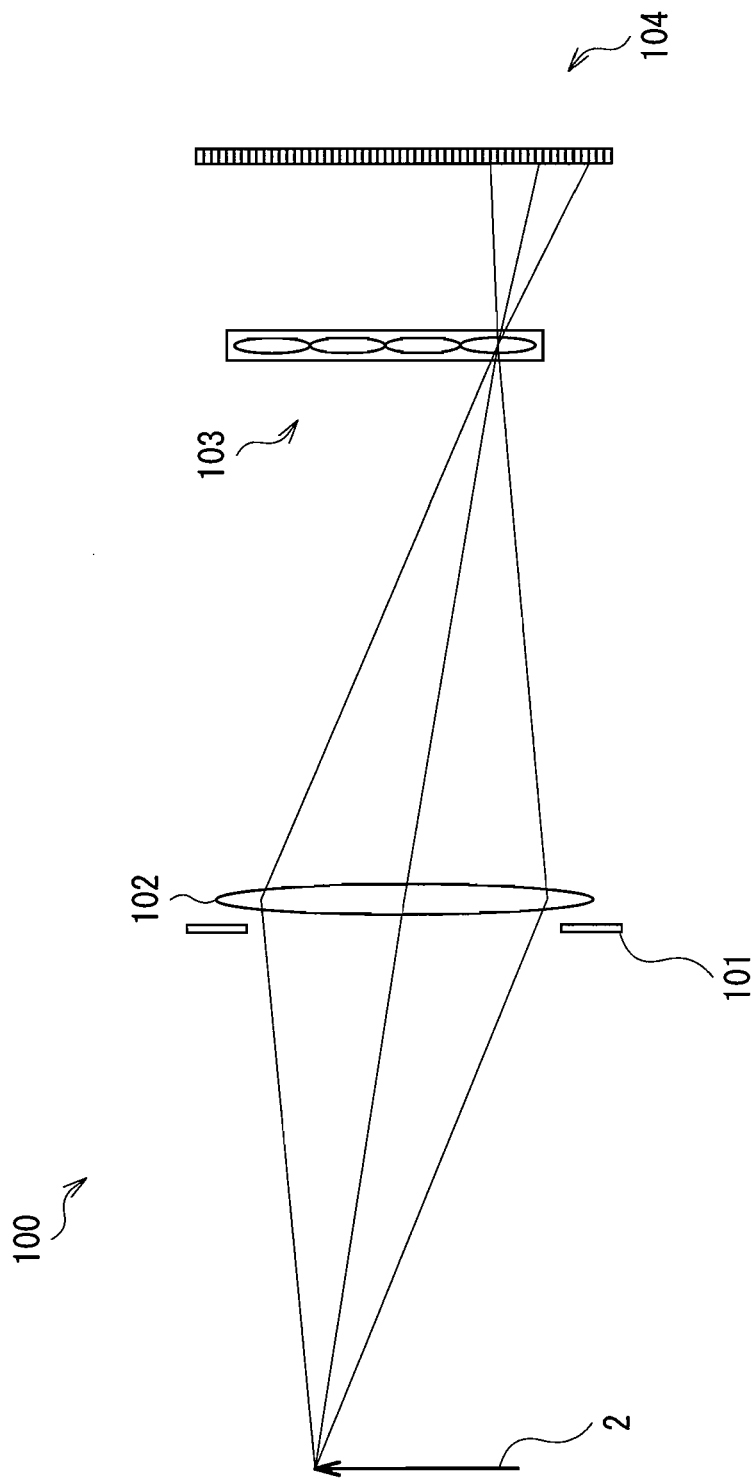
FIG. 14 is an illustration of a schematic configuration of an image pickup apparatus according to an example of related art.
Figure 15:
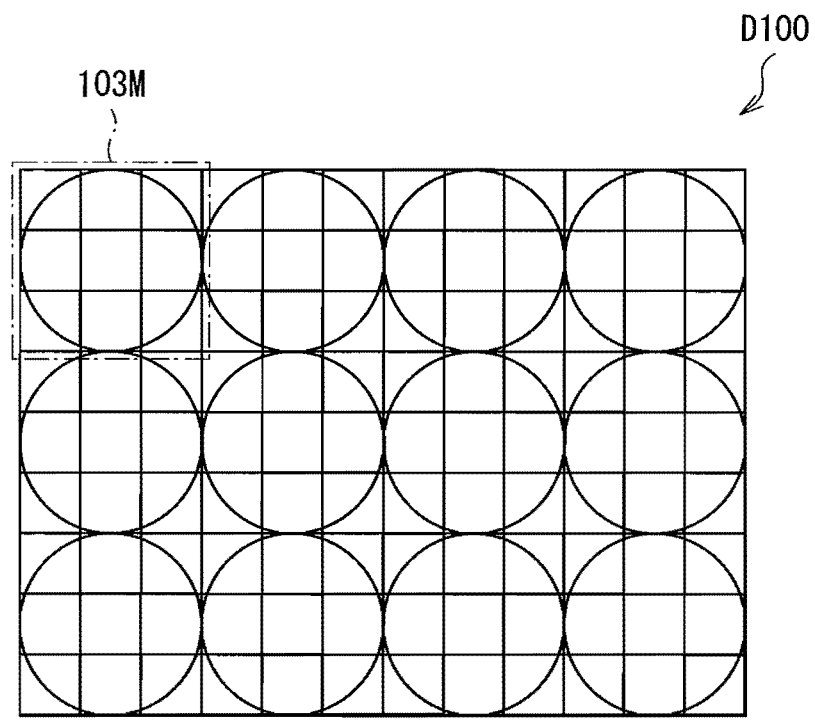
FIG. 15 is a schematic view of image pickup data obtained by the image pickup apparatus illustrated in FIG. 14.

Next, as illustrated in FIG. 10, the pixel interpolation processing section 144 performs pixel interpolation processing on a peripheral region 130M around the image data 13M1 produced in the above-described manner. For example, interpolation is performed on the peripheral region 130M around the image 13M1 for one pixel to produce image data 13M2 including pixel data for 3×3=9 pixels. Thereby, image data D2 including a number of two-dimensional pixels equal to the number of pixels arranged on the image pickup device 13 is produced. As such pixel interpolation processing, for example, a bicubic method or the like is applicable. An example of pixel interpolation processing using the bicubic method is schematically illustrated in FIG. 11.

In the bicubic method, for example, a pixel value G of a pixel (hereinafter referred to interpolation pixel) P corresponding to the above-described peripheral region 130M to be subjected to interpolation is calculated through the use of a predetermined cubic function on the basis of 16 actual pixels Pmn (m, n: an integer of 1 to 4) arranged in positions close to the interpolation pixel P. For example, as illustrated in FIG. 11, x1 to x4 and y1 to y4 in the coordinates (xm, yn) of actual pixels Pmn are defined as indicated by (A), where the coordinates of the interpolation pixel P is (x, y). The pixel value G of the interpolation pixel P is calculated by the following formula (11) through the use of the coordinates (xm, yn) of the actual pixels Pnm, a pixel value Gmn and a cubic function represented by the following formula (12).

Mathematical Formula 2

$$G = \{(f(y1)f(y2)f(y3)f(y4))\} \begin{pmatrix} G11 & G21 & G31 & G41 \\ G12 & G22 & G32 & G42 \\ G13 & G23 & G33 & G43 \\ G14 & G24 & G34 & G44 \end{pmatrix} \begin{pmatrix} f(x1) \\ f(x2) \\ f(x3) \\ f(x4) \end{pmatrix} \quad (11)$$

(Gmn: pixel value of (xm, yn))

$$f(t) = \begin{cases} 1 - 2|t|^2 + |t|^3 & (0 \le |t| < 1) \\ 4 - 8|t| + 5|t|^2 - |t|^3 & (1 \le |t| < 2) \\ 0 & (2 \le |t|) \end{cases} \quad (12)$$

The noise reduction section 145, the edge enhancement section 146, the white balance processing section 147 and the gamma correction section 148 perform the above-described predetermined processing on the image data D2 obtained by performing the pixel interpolation processing in the above-described manner, and the image data D2 is outputted as the image data DRout.

As described above, in the embodiment, the lens substrate 12 partially including the microlenses 12A is arranged between the image pickup lens 11 and the image pickup device 13, so the distance data DPout from the image pickup lens 11 to the object is produced on the basis of the pixel data 13D in the microlens corresponding region 13M of the image pickup data D0 by the distance information extraction section 143 of the image processing section 14. Moreover, in the image interpolation processing section 144, pixel interpolation processing is performed on the pixels in the microlens corresponding region 13M, so compared to the case where a microlens array in which microlenses are arranged on the whole surface thereof is used, a two-dimensional image with higher resolution is produced. Therefore, the distance to the object is measured, and a two-dimensional image with higher resolution than ever before is produced.

Although the present invention is described referring to the embodiment, the invention is not limited thereto, and may be variously modified. For example, in the above-described embodiment, a configuration in which in the lens substrate 12, three microlenses 12A are arranged in contact with one another, and 3×3=9 pixels are allocated to each microlens 12A is described as an example. However, the positions and the number of microlenses, the number of allocated pixels, or the like is not limited thereto. In the case where in the distance information extraction section 143, parallax images are produced first, and a phase difference between the parallax images is detected to calculate distance information on the basis of the phase difference, at least two pixels are allocated to each microlens 12A to produce the parallax images.

Moreover, in the above-described embodiment, the bicubic method is described as an example of pixel interpolation processing. However, the pixel interpolation processing is not limited to the bicubic method, and any other pixel interpolation processing may be used. For example, as illustrated in FIG. 12, a coordinate x may be calculated by linear interpolation (x=(x1+x2)/2) through the use of actual pixels P1(x1) and P2(x2) arranged close to an interpolation pixel P(x).

Further, in the above-described embodiment, a configuration using the lens substrate 12, that is, a configuration in which the microlenses 12A are arranged in a part of the substrate is described as an example. However, the microlenses 12A are not necessarily arranged on the substrate. For example, as illustrated in FIG. 13A, a microlens 30 may be directly arranged in a partial region of a light-sensing plane of the image pickup device 13. In other words, in FIG. 13A, the microlens 30 is integrally arranged as a part of the image pickup device 13. FIG. 13B illustrates an enlarged view of the microlens 30 and its surroundings. For example, 3×3 image pickup pixels P are allocated to the microlens 30, and an on-chip lens 31 for efficiently condensing a detected light ray is arranged on a light-sensing plane of each image pickup pixel P. The microlens 30 is formed on the on-chip lenses 31 with, for example, a resin layer 32 in between. As described above, the lens substrate including a microlens is not necessarily used, and the microlens 30 may be directly formed only in a partial region of the image pickup device 13. Even in such a configuration, the same effects as those in the invention may be obtained.

In the above-described embodiment, the color filter is arranged only in a region facing the glass substrate 12B on the light-sensing plane of the image pickup device 13, and color interpolation processing is performed only on pixel data based on a light ray having passed through the glass substrate 12B. However, the configuration of the color filter and color interpolation processing are not limited thereto. For example, a color filter may be arranged on the whole light-sensing plane of the image pickup device 13, and color interpolation processing may be performed on the whole image pickup data D0. Moreover, a 3CCD system using independent image pickup devices for light of three primary colors may be used.

In the distance information extraction section 143, a phase difference between two parallax images with different parallaxes is detected. However, the invention is not limited thereto, and a phase difference may be detected on the basis of three or more parallax images.

In the above-described embodiment, the aperture stop 10 is arranged on an object side of the image pickup lens (an incident side). However, the invention is not limited thereto, and the aperture stop 10 may be arranged on an image side of the image pickup lens (an exit side) or in the image pickup lens.

The present application contains subject matter related to that disclosed in Japanese Priority Patent Application JP 2008-221813 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a distance measurement section configured to measure a distance from an image pickup lens to a measurement object based on pixel data in a region of an image pickup device; and
an interpolation section configured to interpolate pixel data for the region of the image pickup device.

2. The image processing apparatus according to claim 1, wherein the distance measurement section includes:
a phase difference detection section configured to produce a plurality of parallax images based on the pixel data in the region of the image pickup device and detect a phase difference based on the plurality of parallax images.

3. The image processing apparatus according to claim 2, wherein the distance measurement section further includes:
a distance calculation section configured to calculate the distance based on the phase difference.

4. The image processing apparatus according to claim 1, wherein the image pickup device is positioned on the focal plane of the image pickup lens.

5. The image processing apparatus according to claim 4, further comprising:
at least one microlens arranged between the image pickup lens and the image pickup device, each microlens of the at least one microlens corresponding to a plurality of pixels in a first region of the image pickup device,
wherein the microlenses are arranged so that a distance from the image pickup device to the microlenses is equal to the focal length of the microlenses.

6. The image processing apparatus according to claim 5, wherein the distance measurement section is configured to perform correction on the distance in consideration of the focal length of the microlenses.

7. The image pickup apparatus according to claim 1, further comprising:
at least one microlens arranged between an image pickup lens and the image pickup device, each microlens of the at least one microlens corresponding to a plurality of pixels in a first region of the image pickup device,
wherein the pixel data in the region of the image pickup device include intensity data and directional data for light that passes through the image pickup lens and one of the at least one microlens.

8. An image processing method comprising:
measuring a distance from an image pickup lens to a measurement object based on pixel data in a region of an image pickup device; and
interpolating pixel data for the region of the image pickup device.

9. The image processing method according to claim 8, further comprising:
producing a plurality of parallax images based on the pixel data in the region of the image pickup device; and
detecting a phase difference based on the plurality of parallax images.

10. The image processing method according to claim 9, further comprising:
calculating the distance based on the phase difference.

11. The image processing method according to claim 8, wherein the image pickup device is positioned on the focal plane of the image pickup lens.

12. The image processing method according to claim 11, further comprising:
arranging at least one microlens between the image pickup lens and the image pickup device, each microlens of the at least one microlens corresponding to a plurality of pixels in a first region of the image pickup device,
wherein the microlenses are arranged so that a distance from the image pickup device to the microlenses is equal to the focal length of the microlenses.

13. The image processing method according to claim 12, further comprising:
performing correction on the distance in consideration of the focal length of the microlenses.

14. The image pickup method according to claim 8, further comprising:
arranging at least one microlens between the image pickup lens and the image pickup device, each microlens of the at least one microlens corresponding to a plurality of pixels in a first region of the image pickup device,
wherein the pixel data in the region of the image pickup device include intensity data and directional data for light that passes through the image pickup lens and one of the at least one microlens.

* * * * *